United States Patent
Nordkvist

(10) Patent No.: US 12,195,212 B2
(45) Date of Patent: Jan. 14, 2025

(54) AERIAL TREE HARVESTING SYSTEM

(71) Applicant: AirForestry AB, Uppsala (SE)

(72) Inventor: Johan Nordkvist, Västra Frölunda (SE)

(73) Assignee: AIRFORESTRY AB, Uppsala (SE)

( * ) Notice: Subject to any disclaimer, the term of this patent is extended or adjusted under 35 U.S.C. 154(b) by 140 days.

(21) Appl. No.: 18/177,463

(22) Filed: Mar. 2, 2023

(65) Prior Publication Data
US 2023/0278732 A1    Sep. 7, 2023

Related U.S. Application Data

(60) Provisional application No. 63/316,230, filed on Mar. 3, 2022.

(51) Int. Cl.
*B64U 20/87* (2023.01)
*A01G 23/095* (2006.01)
*B64U 101/40* (2023.01)
*B66C 13/06* (2006.01)

(52) U.S. Cl.
CPC .......... *B64U 20/87* (2023.01); *A01G 23/0955* (2013.01); *B66C 13/06* (2013.01); *B64U 2101/40* (2023.01); *B64U 2201/20* (2023.01)

(58) Field of Classification Search
CPC ............ B64U 2101/40; A01G 23/00; A01G 23/0955; B66C 13/06; B66C 13/063
See application file for complete search history.

(56) References Cited

U.S. PATENT DOCUMENTS

| | | | |
|---|---|---|---|
| 5,898,746 A * | 4/1999 | Baversten | B66C 13/08 294/81.4 |
| 6,263,932 B1 | 7/2001 | Chalifoux | |
| 9,944,366 B2 * | 4/2018 | Tang | B63C 9/01 |
| 10,479,503 B2 * | 11/2019 | Sikora | B64D 9/00 |

(Continued)

FOREIGN PATENT DOCUMENTS

| | | |
|---|---|---|
| CN | 109287308 A | 2/2019 |
| EP | 2743788 A2 | 6/2014 |

(Continued)

OTHER PUBLICATIONS

Hagner, Mats, "Propelled Balloons for Harvesting and Transporting Timber", Forestry, (7 pages), Apr. 2002, DOI: 10.1093/forestry/75.4.495.

(Continued)

*Primary Examiner* — Philip J Bonzell
*Assistant Examiner* — Eric Acosta
(74) *Attorney, Agent, or Firm* — Alston & Bird LLP

(57) ABSTRACT

The present invention relates to an unmanned aerial tree harvesting system comprising a remotely and/or autonomously controlled UAV, an autonomously and/or remotely controlled tree harvesting tool configured for holding and/or delimbing and/or cutting at least a portion of a tree trunk attached underneath the UAV via at least one cord, a means configured for detecting rotational motion and/or pendulum motion of the tree harvesting tool, means attached to the UAV configured for detecting trees from above, at least one remotely and/or autonomously controlled forcing means, attached to the tree harvesting tool, configured for at least damping detected pendulum motion of the tree harvesting tool.

22 Claims, 5 Drawing Sheets

(56) References Cited

U.S. PATENT DOCUMENTS

2014/0163781 A1  6/2014  Vian
2019/0200534 A1  7/2019  Hawkins

FOREIGN PATENT DOCUMENTS

| EP | 3175700 B1 | | 1/2016 | |
| SE | 1750755 A1 | | 1/2019 | |
| WO | WO 2018/033925 A1 | | 2/2018 | |
| WO | WO-2018048774 A1 | * | 3/2018 | ............. B64C 19/00 |

OTHER PUBLICATIONS

Charron, G. et al., "The DeLeaves: a UAV Device for Efficient Tree Canopy Sampling", NRC Research Press, (20 pages), May 28, 2020, doi.org/10.1139/juvs-2020-0005.

Kaslin, F et al., "Novel Twig Sampling Method by Unmanned Aerial Vehicle (UAV)", Methods, vol. 1, Article 2, (6 pages), Oct. 18, 2018, doi:10.3389/ffgc.2018.00002.

Frontiers, "Video S1", Supplementary Material to Novel Twig Sampling Method by Unmanned Aerial Vehicle (UAV) viewed on the Internet at https://www.frontiersin.org/articles/10.3389/ffgc.2018.00002/full#supplementary-material on Mar. 11, 2024, 1 page.

Colin, Chris, "How Mythbuster Jamie Hyneman Hacked a Drone to Trim His Trees", https://www.popularmechanics.com/flight/drones/a26102/jamie-hyneman-drone-plants, Feb. 19, 2024, (6 pages).

Finzgar, D. et al., "Development of A Patented Unmanned Aerial Vehicle Based System for Tree Canopy Sampling", Gozdarski inštitut Slovenije, (5 pages), Dec. 29, 2016.

Wu, Bailey, et al., "Sampler Drone for Plant Physiology and Tissue Research", UC Santa Barbara College of Engineering, (1 page), 2018.

* cited by examiner

AERIAL TREE HARVESTING SYSTEM

CROSS REFERENCE TO RELATED APPLICATIONS

The present application claims priority to and the benefit of U.S. provisional patent application 63/316,230, filed Mar. 3, 2022; the entire contents of which as are hereby incorporated by reference herein.

TECHNICAL FIELD OF THE INVENTION

The present invention relates in general to an aerial tree harvesting system, in particular to a tree harvesting tool attached underneath an Unmanned Aerial Vehicle (UAV) and means for improving positioning of the tree harvesting tool relative to a predetermined ground position and/or UAV position.

BACKGROUND OF THE INVENTION

Traditional tree harvesting or tree falling has long been conducted by persons and equipment based on the ground. In earlier times, from the early twentieth century and going back to the early nineteenth century, little consideration was given to the state of the forest or to the eco-system within the forest. Logging was done on a massive scale to keep up with the demand caused by the industrial revolution and the subsequent expansion of human life at the time. Depending on the terrain, the tree harvesting process usually begins with experienced tree fellers cutting down a stand of trees or by using heavy ground based manned harvesting machines.

The above-described methods represent a high level of risk, both to the environment and the people performing the work. Damage can also be done to the delicate ecology of the forest, known as the understory or underbrush, where smaller plants bind the soil together and provide a habitat to insects, birds, lichens, and fungus among other things.

Most importantly, many locations are extremely difficult to reach by land, even with the use of heavy equipment, such as bulldozers, and removal of trees from such locations is expensive. Sometimes it may be desirable to harvest a single tree amongst a stand of trees, so called tree thinning, without disturbing the surrounding trees.

U.S. Pat. No. 6,263,932 discloses an aerial tree harvesting apparatus. A first body of the apparatus is suspended from a helicopter and a second body is suspended by cables from the first body. The apparatus is capable of delimbing and cutting the tree and thereafter transporting the harvested tree to another location.

The problem with the tree harvesting apparatus in U.S. Pat. No. 6,263,932 is that it is very expensive, slow, noisy and complicated to use. Another problem with U.S. Pat. No. 6,263,932 is that it is rather labour intensive, inefficient and difficult to manoeuvre.

WO 2018/048774 discloses methods and systems for damping oscillations of a payload. Oscillations of the payload are taken care of by synchronising the movement of the UAV in direction so as to reduce or eliminate such oscillations. The problem with this method is that high frequency oscillations are difficult for not saying impossible to eliminate. Another problem is that it increases the complexity of operating the UAV, especially in turbulent conditions.

OBJECT OF THE INVENTION

The present invention aims at obviating the aforementioned problem.

A primary object of the present invention is to provide an improved aerial tree harvesting system comprising a tree harvesting tool attached to a UAV via at least one cord.

Another object of the present invention is to provide an improved method for controlling a tree harvesting tool attached via at least one cord beneath a remotely and/or autonomously controlled UAV.

Yet another object of the present invention is to provide an improved aerial tree harvesting method.

SUMMARY OF THE INVENTION

According to the invention at least the primary object is attained by means of the unmanned aerial tree harvesting system having the features defined in the independent claim. Preferred embodiments of the present invention are further defined in the dependent claims.

According to a first aspect of the present invention it is provided an unmanned aerial tree harvesting system comprising a remotely and/or autonomously controlled UAV, an autonomously and/or remotely controlled tree harvesting tool configured for holding and/or delimbing and/or cutting at least a portion of a tree trunk, and attached underneath the UAV via at least one cord, a means configured for detecting rotational motion and/or pendulum motion of the tree harvesting tool, a base station configured for communication with the UAV, means attached to the UAV configured for detecting trees from above, at least one remotely and/or autonomously controlled forcing means, attached to the tree harvesting tool, configured for damping detected pendulum motion of the tree harvesting tool and/or configured for moving the tree harvesting tool in a predetermined horizontal direction and/or configured for rotating the tree harvesting tool around a vertical direction and/or configured for damping detected rotational movement of the tree harvesting tool around a vertical direction.

The advantage of this invention is that a tree harvesting tool hanging beneath a UAV in at least one cord can be moved in a predetermined direction, rotated a predetermined angle, damping pendulum and/or rotational movement with means independent from the operation of the UAV. Another advantage is that the forcing means attached to the harvesting tool may perform a damping and/or moving action on the tree harvesting tool in a shorter time compared to a similar damping and/or moving action of the tree harvesting tool made by the UAV. Yet another advantage of the present invention is that if the UAV may be hindered by obstacles for performing the damping and/or movement of the tree harvesting tool, the tree harvesting tool may nevertheless be set to a desired position and/or having any rotational or pendulum motions reduced or eliminated by the forcing means.

In various example embodiments of the present invention, the at least one cord is attached to an autonomously and/or remotely controlled winch configured for rolling in or rolling out the cord, where the winch is attached to the UAV and/or the tree harvesting tool.

The advantage of these embodiments is that the tree harvesting tool may be set at various distances from the UAV in order to reach a shorter tree surrounded by longer trees in a tree thinning process.

In various example embodiments of the present invention, the forcing means is at least one propeller motor and/or at least one gas ejecting means.

The advantage of these embodiments is that the forcing means may be made small and light. Another advantage is that such propeller and/or gas ejecting means may be removably attached to the tree harvesting tool.

In various example embodiments of the present invention, the removably attached forcing means is at least one autonomously and/or remotely controlled minidrone.

The advantage of these embodiments is that the position adjustments and/or the damping rotational and/or pendulum motions of the tree harvesting tool may be made with a minidrone, which may be attached when needed to the tree harvesting tool. The minidrone may be detached from the tree harvesting tool when performing delimbing actions with the tree harvesting tool, cutting actions with the tree harvesting tool and/or transportation of harvested tree(s) for reducing or eliminating any damage to the minidrone when it is not needed. The tree harvesting tool may further comprise a remotely and/or autonomously controlled docking means for engaging or disengaging the tree harvesting tool with the minidrone, which means that attachment and detachment may be made one or a plurality of times during harvesting a single tree.

In various example embodiments of the present invention, the minidrone is attached to the UAV via at least one cord where the cord is configured to be rolled in or rolled out by a winch provided on the UAV and/or the tree harvesting tool.

The advantage of these embodiments is that the minidrone may be lifted up by the UAV when the minidrone has accomplished its stabilizing action or movement action. Another advantage is that there is no need for complex operation of the minidrone when being detached from the tree harvesting tool, it can simply be lifted up to the UAV by the winch on the UAV and/or on the tree harvesting tool.

In various example embodiments of the present invention, the tree harvesting tool may comprises a platform. The platform may be configured to be set in a folded rest position or a folded out minidrone attachment position. The platform is autonomously and/or remotely controlled to be set in the folded rest position or a folded out minidrone attachment position.

The advantage of these embodiments is that the platform may be folded out when needed.

In various example embodiments of the present invention, a camera is provided on the UAV with a field of view in a direction towards ground and means configured for sending out wireless video data from the camera to, for instance, the base station.

The advantage of these embodiments is that the camera may detect tree to be harvested and controlling the position of the tree harvesting tool. The UAV, the camera and the forcing means may be configured to provide the tree harvesting tool at a predetermined position above a predetermined tree and with a predetermined rotational position with respect to a longitudinal axis of the tree harvesting tool. An additional camera may be provided on the minidrone, which may assist in positioning of the minidrone, and detecting the platform.

In another aspect of the present invention it is provided a method for controlling a tree harvesting tool attached via at least one cord beneath a remotely and/or autonomously controlled UAV. The method comprising the step of damping pendulum motion and/or damping rotational movement of the tree harvesting tool and/or fine adjusting a position of the tree harvesting tool relative to a predetermined position by means of at least one remotely and/or autonomously controlled forcing means attached to the tree harvesting tool.

The advantage of this invention is that a tree harvesting tool hanging beneath a UAV in at least one cord can be moved in a predetermined direction, rotated a predetermined angle, damping pendulum and/or rotational movement with means independent from the operation of the UAV. Another advantage is that the forcing means attached to the harvesting tool may perform a damping and/or moving action on the tree harvesting tool in a shorter time compared to a similar damping and/or moving action of the tree harvesting tool made by the UAV. Yet another advantage of the present invention is that if UAV may be hindered by obstacles for performing the damping and/or movement of the tree harvesting tool, the tree harvesting tool may nevertheless be set to a desired position and/or having any rotational or pendulum motions reduced or eliminated by the forcing means.

In various example embodiments of the present invention, the method further comprising the step of controlling autonomously and/or remotely a winch, where the winch is attached to the UAV and/or the tree harvesting tool for reducing and/or increasing the distance between the UAV and the tree harvesting tool by rolling in or rolling out the cord by the winch.

The advantage of these embodiments is that the tree harvesting tool may be set at various distances from the UAV in order to reach a shorter tree surrounded by longer trees in a tree thinning process.

In various example embodiments of the present invention, the forcing means may be a gas ejecting means and/or at least one minidrone removably attached to the UAV.

In another aspect of the present invention it is provided an aerial tree harvesting method comprising the steps of:
  providing a tree harvesting tool having delimbing means, attached beneath a primary UAV via at least one cord, at a predetermined distance above a tree to be harvested,
  adjusting a position of the tree harvesting tool and/or damping a pendulum and/or a rotational motion of the tree harvesting tool by a secondary UAV removably attached to the tree harvesting tool,
  releasing the tree harvesting tool from the UAV, and
  detaching the secondary UAV from the tree harvesting tool at a predetermined time period before or after the tree harvesting tool is released towards ground from the primary UAV for delimbing the tree to be harvested.

The advantage of this invention is that a primary drone, which may be the UAV, may be used for long transport of a tree harvesting tool with or without harvested trees and a secondary drone, which may be the minidrone, may be used for fine adjustments of the tree harvesting tool when necessary. The primary and secondary drones may work independently of each other. Any fine adjustment of the tree harvesting tool by the secondary drone will not affect the operation of the primary drone.

In various example embodiments of the present invention, the detaching of the secondary UAV from the tree harvesting tool is made before a delimbing process is started.

The advantage of these embodiments is that the secondary drone may be detached from the tree harvesting tool when harvesting a tree has started thereby reducing or eliminating any damage the secondary drone by the harvesting process.

In various example embodiments of the present invention, the primary UAV is always above the canopy of the tree to be harvested, while the secondary UAV may be above and/or below the canopy of the tree to be harvested.

The secondary drone may assist in positioning of the tree harvesting tool and/or damping or initiate rotational and/or pendulum motion. The secondary drone may also have a camera for assisting in monitoring the harvesting process from a different field of view compared to a camera provided on the primary drone. The field of view of the secondary drone may be changed according to instructions from an operator. The secondary drone may fly beneath the canopy for monitoring the delimbing process at distance and/or the cutting of the tree trunk and/or inspecting the tree stump after completed harvesting. The secondary drone may also fly below the canopy prior to harvesting for collecting information of the tree and/or ground conditions close to the tree.

In a further aspect of the present invention it is provided an unmanned aerial system comprising a remotely and/or autonomously controlled UAV and an autonomously and/or remotely controlled holding tool configured for holding a payload. The holding tool is attached underneath the UAV via at least one cord. The system also comprises a means configured for detecting rotational motion and/or pendulum motion of the holding tool, a base station configured for communication with the UAV and means attached to the UAV configured for detecting payload from above. The system further comprises at least one remotely and/or autonomously controlled forcing means, attached to the holding tool, configured for damping detected pendulum motion of the holding tool and/or configured for moving the holding tool in a predetermined horizontal direction and/or configured for rotating the holding tool around a vertical direction and/or configured for damping detected rotational movement of the holding tool around a vertical direction.

The advantage of this invention is that a holding tool hanging beneath a UAV in at least one cord can be moved in a predetermined direction, rotated a predetermined angle, damping pendulum and/or rotational movement with means independent from the operation of the UAV. Another advantage is that the forcing means attached to the holding tool may perform a damping and/or moving action on the holding tool in a shorter time compared to a similar damping and/or moving action of the holding tool made by the UAV. Yet another advantage of the present invention is that if the UAV may be hindered by obstacles for performing the damping and/or movement of the holding tool, the holding tool may nevertheless be set to a desired position and/or having any rotational or pendulum motions reduced or eliminated by the forcing means.

In various example embodiments of the present invention, the forcing means is removably attached to the holding tool.

In various example embodiments of the present invention, the removably attached forcing means is at least one autonomously and/or remotely controlled minidrone.

The advantage of these embodiments is that the position adjustments and/or the damping rotational and/or pendulum motions of the holding tool may be made with a minidrone, which may be attached when needed to the holding tool. The minidrone may be detached from the holding tool when transporting a payload for reducing or eliminating any damage to the minidrone when it is not needed.

Further advantages with and features of the invention will be apparent from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

The word tree used hereinabove and hereinbelow is a generic term for any tree(s) and/or any bush(es).

The word harvesting used hereinabove and hereinbelow is a generic term for removing at least a portion from a tree, i.e., cutting a portion of the tree, cutting the full tree and/or removing the tree with at least a portion of its roots from the ground.

Figure 1:
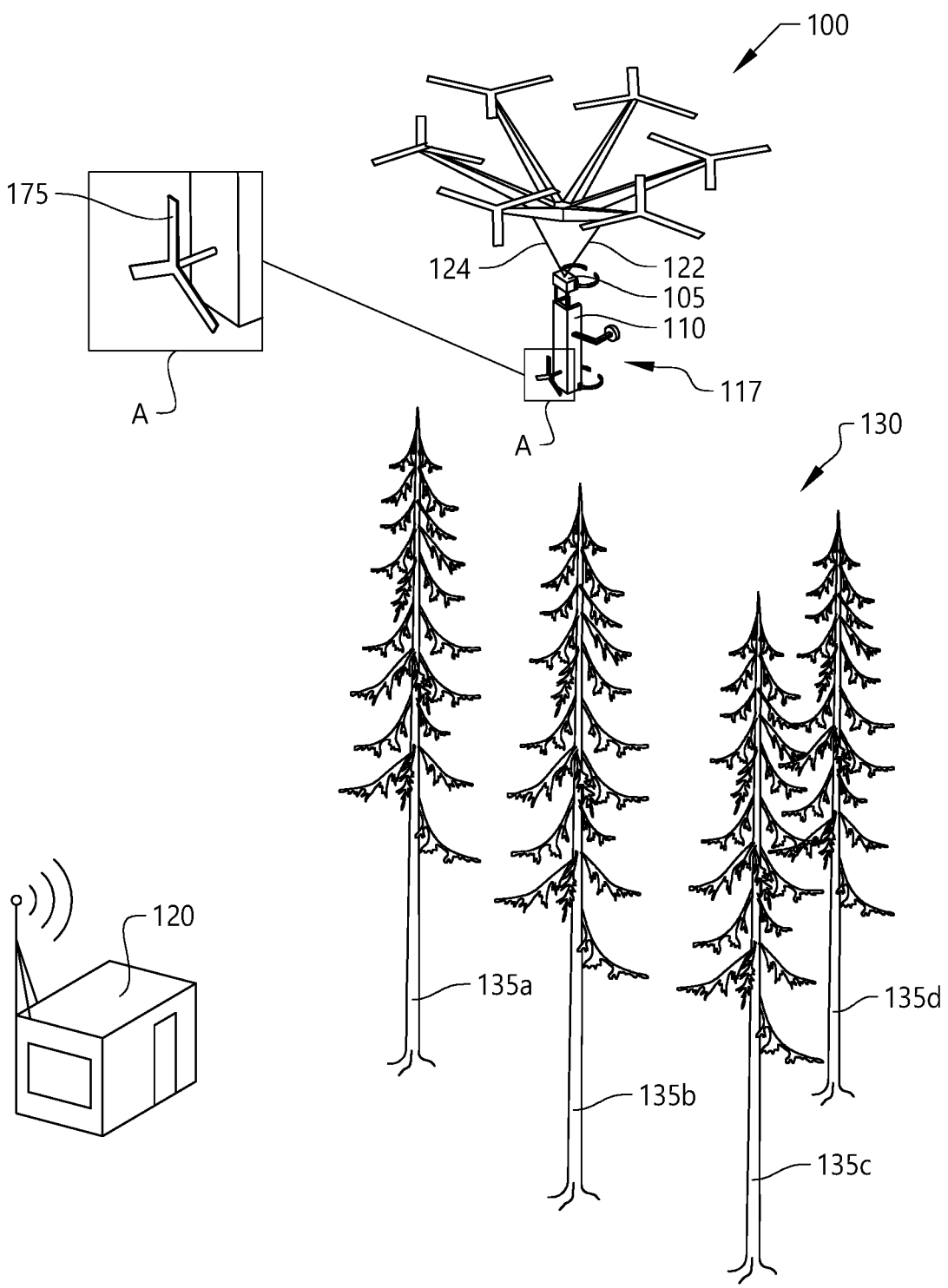
FIG. 1 depicts a first example embodiment of an aerial tree harvesting system according to the present invention.
Figure 2:
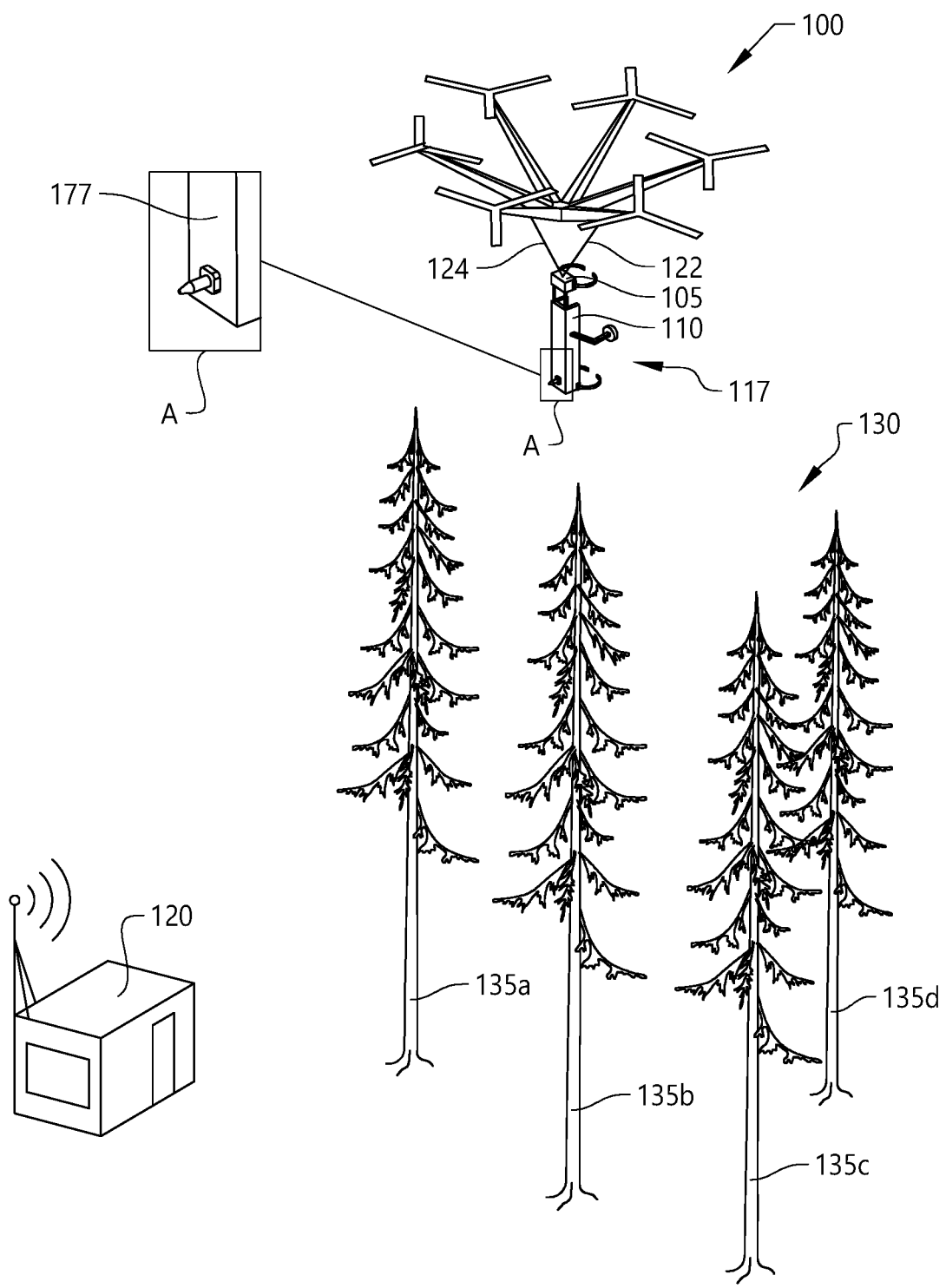
FIG. 2 depicts a second example embodiment of an aerial tree harvesting system according to the present invention.

FIGS. 1-2 depict schematic pictures of different inventive remote and/or autonomous aerial tree harvesting systems 1 according to the present invention. The aerial tree harvesting system 1 may comprise a remotely and/or autonomously controlled tree harvesting tool 117 configured for harvesting, delimbing, holding and/or transporting at least a portion of a tree 135a-135d and a remotely and/or autonomously controlled Unmanned Aerial Vehicle (UAV) 100. The tree harvesting tool 117 is attached underneath the UAV 100 via at least one cord 122, 124. The aerial tree harvesting system 1 further comprising at least one means for detecting a tree 135a-135d to be harvested and/or transported and a base station 120 for controlling the tree harvesting tool 117 and the UAV 100. The aerial tree harvesting system 1 further comprising forcing means 175, 177, 180 attached to the tree harvesting tool 117, configured for damping detected pendulum motion of the tree harvesting tool 117 and/or configured for moving the tree harvesting tool 117 in a predetermined horizontal direction and/or configured for rotating the tree harvesting tool 117 around the at least one cord 122, 124 and/or configured for damping detected rotational movement of the tree harvesting tool 117 around the at least one cord 122, 124.

In FIG. 1 the UAV 100 is carrying the remotely and/or autonomously controlled tree harvesting tool 117 on its way to harvest at least a portion of a tree 135a-135d in a forest 130. The UAV 100 is remotely controlled by the base station 120 and/or autonomously controlled and optionally communicating with base station 120. The base station 120 may be a stationary unit or a mobile unit. The means for detecting a tree to be harvested and/or transported may communicate with an operator (remote control) or a software program (autonomous control) via video data.

In FIGS. 1-2, the UAV 100 can be considered as a forestry forwarder and the tree harvesting tool 117 configured for harvesting at least a portion of a tree 135a-135d can be considered to be a forestry harvester.

The autonomously controlled aerial tree harvesting system 1 is able to operate without being controlled directly by humans, whereas a remotely controlled aerial tree harvesting system 1 is able to be operated from a remote distance controlled directly by humans. In various example embodiments, the tree harvesting tool 117 and the UAV 100 are remotely controlled. In various example embodiment, the tree harvesting tool 117 and the UAV 100 are autonomously controlled. In various example embodiments, the tree harvesting tool 117 is remotely controlled and the UAV 100 is autonomously controlled. In various example embodiments, the tree harvesting tool 117 is autonomously controlled and the UAV 100 is remotely controlled.

The means for detecting a tree may be at least one of a camera or an optical sensor. The camera may be at least one of for example an IR-camera (Infrared-camera), NIR-camera (Near Infrared-camera), a VISNIR-camera (Visual Near Infrared-camera), a CCD camera (Charged Coupled Device-camera), a CMOS-camera (Complementary Metal Oxide Semiconductor-camera), a digital camera, a 3D camera e.g., stereo camera, time-of-flight camera or LiDAR. The optical sensor may at least one of a photodetector, pyrometer, proximity detector and/or an infrared sensor.

The means for detecting a tree may be arranged on the UAV 100 and/or the tree harvesting tool 117.

The aerial tree harvesting system 1 may further comprise means for detecting at least one of the group of tree parameters, which may be the same means as being used for detecting a tree and/or an additional means. The additional means may be at least one of a camera or an optical sensor. The camera may be at least one of for example an IR-camera, NIR-camera, a VISNIR-camera, a CCD camera, a CMOS-camera, a digital camera, a 3D camera e.g., stereo camera, time-of-flight camera or LiDAR, a spectral camera, a heat sensitive camera, an ultrasonic measurement device, a radar device, a vibration device. The optical sensor may be at least one of a photodetector, pyrometer, proximity detector and/or an infrared sensor. A 3D picture may see through foliage and/or branches. A mean value of multiple 3D images may result in mm precision images. 3D pictures may reveal lots of information about branches, tree trunk and/or tree species. 3D images may be taken from an airborne vehicle, such as a UAV 100. The spectral camera may be used for measuring vegetation index (NDVI), i.e., a measure of the photosynthesis in a particular area. Heat sensitive cameras may be used for measuring the temperature of the surface of the tree trunk, which in turn may be a measure of the health of the tree, an insect infestation tree has a higher surface temperature than a non-infested tree. Ultrasonic measurement and/or radar may be used for determining the inner form of the tree, i.e., rotten or hollow inner structure and/or the inner moisture content of the tree. Computer tomography and/or magnetic resonance imaging can give information about a portion of a tree down to a tree cell level.

The means for detecting at least one of the group of tree parameters may be a camera or optical sensor in combination with Artificial Intelligence (AI). AI may be used for training a model for recognizing one or a plurality of the tree parameters. Tree parameters may be recognized visually and/or by measurement and/or by at least on physical sample. Measurement may be made by optical inspection at a distance from the tree and/or by physical measurement, for instance integrated in the tree harvesting tool 117. The means for detecting at least one tree parameter may be a laser scanner attached to the UAV 100 and/or the tree harvesting tool 117.

A final destination of the at least a portion of the tree may be determined by at least one of the detected tree parameters and/or at least one detected growing condition. Tree parameters can be considered to be intrinsic features and growing conditions can be considered to be extrinsic features.

Tree parameters may, for instance, be a diameter of the at least a portion of a tree (top diameter, base diameter, mean diameter, median diameter), length of the at least a portion of a tree, tree species of the at least a portion of a tree and/or the weight of the at least a portion of a tree, dry content, age of tree, number of annual rings, distance between annual rings, color of annual rings, width of annual rings, amount of leaves, amount of fir needle, color, chemical composition of the tree, twig-free, deformation(s), cracks (dry cracks (partial or all trough), end crack, ring crack), rootstock, density, rot, discolored, dead tree, insect infested, microorganism infested, weather damage (storm, wind, fire, drought), machine damage (root, tree trunk), amount of fruits, seeds, berries, nuts, cones, flowers on the tree, form of root, root structure, root depth, root volume etc. The color of the tree may be an indicator of tree species. The color may be the color of the outer surface of the tree trunk or the color of a cut area. The form of the tree may be determined by a 3D camera. Form may comprise total volume of tree, leaves or fir needles, deformations, shape deviations, etc. Tree parameters may also comprise material properties of the tree such as moisture content (%), tensile strength (MPa), flexural strength (MPa), compressive strength (MPa), shear strength (MPa), impact strength (KJ/m$^2$), hardness (Brinell, Vickers, Rockwell), elasticity module (MPa), thermal conductivity (W/m° C.), heat capacity (J/kg° C.), Calorific value (MJ/kg), etc.

Growing conditions may, for instance, be number of trees per unit area and/or growth potential.

Growing conditions may also be biotic environmental factors (interaction of organisms of the same species and/or interaction of organisms of other species), such as amount of dead tree/wood within a predetermined area, interaction and/or competition of other species, gas and fragrance from plants, temperature of other plants, etc. Fungal infestation and insect infestation may be spread over a large area. It may be advantageous to harvest non-infested trees within a predetermined time after having detected an infested tree in a predetermined area. Fungal and insects may spread over several km. Competition for water, nutrition, and sun hours may be within a distance of 0-50 m. Advantageous interaction/competition situations may be made through sorting out plants in predetermined positions in order to get optimal conditions for the remaining ones.

Growing conditions may also be abiotic environmental factors, climate (temperature, precipitation etc), topography, ground temperature, geology, hydrology, vegetation, soil, earth deposit, soil depth, surface blockage, minerals, ground carbon contents, ground nitrogen content, ground carbon nitrogen ratio, pH value, bas kat ions, amount of trace elements, physical or chemical erosion, environmental condition, wind, etc. Abiotic environmental factors may also be the type of land, such as forest land, arable land, agricultural land, natural pasture, mountain impediment, protected area, power line area, military area, built up land, etc.

At least one tree parameter and/or growing condition may be used as a factor for determining the usage, demand, storage, quality of the at least a portion of the tree. This in turn may be used for determining the final destination of a particular portion of a tree.

Gas sensors may be used to detect water quality (carbon oxide content, methane content, oxygen content etc.).

The UAV 100 may have one or a plurality of propellers. In FIGS. 1-4, the UAV has 6 propellers arranged symmetrically around an origin.

The base station 120 may, when remotely controlled, be operated by at least one human being, whereas, when autonomously controlled, be a base station 120 with programmed software algorithms used for supporting the autonomous UAV 100 and/or tree harvesting tool 117. The base station 120 may be a stationary unit or a mobile unit. The base station 120 may be a handheld mobile unit.

Figure 5:
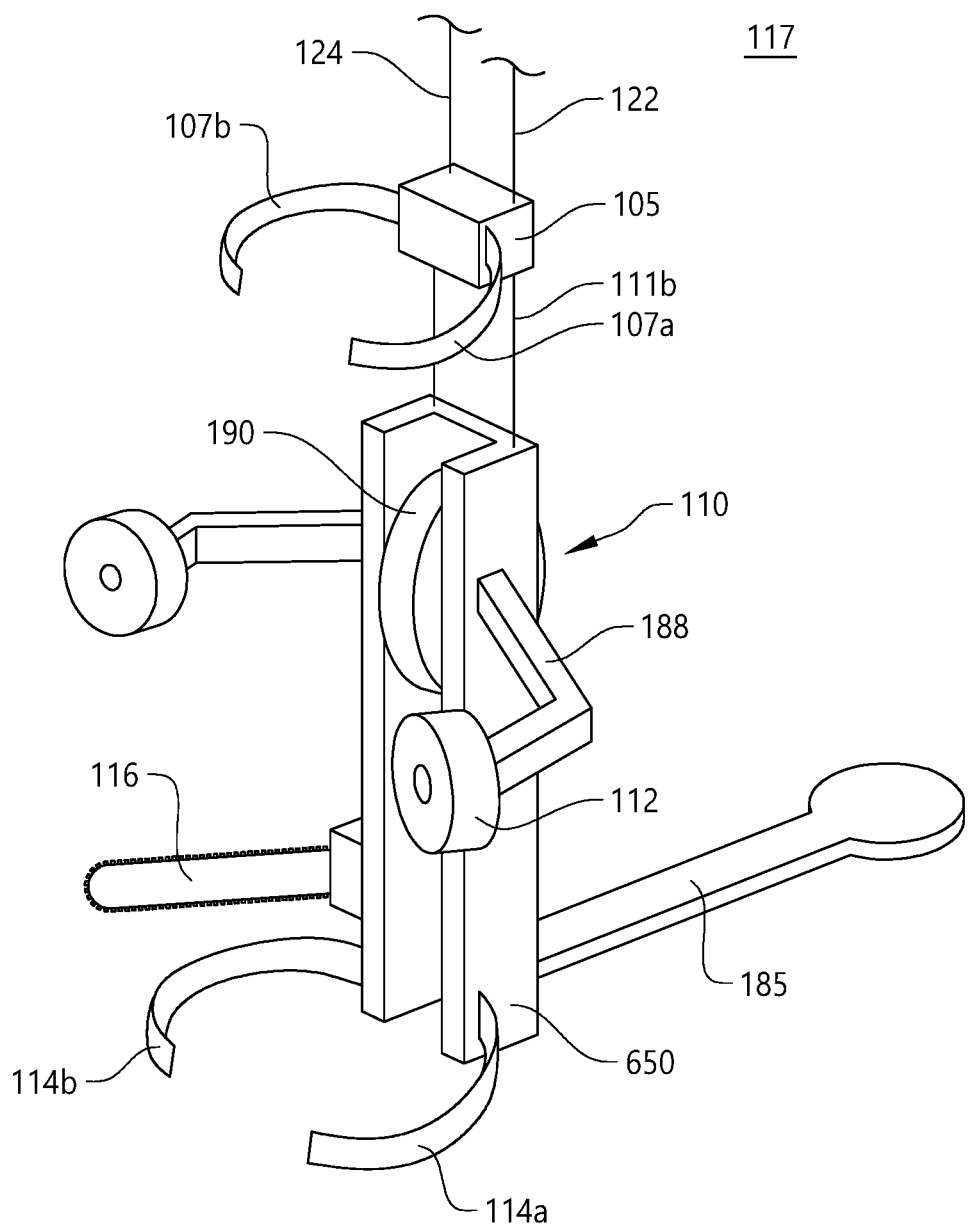
FIG. 5 depicts an example embodiment of an aerial tree harvesting tool according to the present invention.

Holding means 105 configured for holding the tree may be at least one movable gripping arm 107a, 107b, see FIG. 5. In various example embodiments, the holding means 105 configured for holding the tree may be one or a plurality of metal bars, which may at least partially penetrate a tree trunk. In various example embodiments, the holding means 105 configured for holding the tree may be a unit surrounding the tree trunk and being able to change its holding area and thereby compress around the tree trunk for securing purpose and decompress for releasing a tree trunk or entering a tree to be harvested.

In various example embodiments, the tree harvesting tool 117 may be arranged with the holding means 105 for attaching itself to the tree trunk. In various example embodiments, the tree harvesting tool 117 may also be configured for moving up and down along the trunk of the tree. The movement may be performed by at least one electrically driven wheel 190 travelling on the tree trunk, see FIG. 5. In various example embodiments, at least one wheel 190 may be electrically driven for enabling movement up and down the tree trunk and at least one other wheel 112 is arranged for friction reduction during the movement. In various example embodiments, at least two wheels 112, 190 are configured to attach, secure and move the tree harvesting tool 117 on the tree trunk.

In various example embodiments, the tree harvesting tool 117 may also be configured for moving on ground. The movement can be made via a plurality of wheels or legs and/or as a tracked vehicle.

The UAV 100 and the tree harvesting tool 117 may be communicating with each other via one or more of WiFi, Bluetooth, radio communication, telecommunication (3G, 4G, 5G), optical fibre and/or electrical wire. In various example embodiments, the base station 120 and the UAV 100 and/or the tree harvesting tool 117 may be communicating with each other via one or more of WiFi, Bluetooth, radio communication, telecommunication (3G, 4G, 5G). Depending on the distance and/or communication quality between the base station 120 and the UAV 100 and/or the tree harvesting tool 117 the communication may change from one type of communication to another.

In various example embodiments, the tree harvesting tool 117 is connectable to an underside of the UAV 100. In various example embodiments, the tree harvesting tool 117 may be released from the UAV 100 directly onto a tree to be harvested or on the ground at or near the tree to be harvested. In various example embodiments, the tree harvesting tool 117 may be provided at a distance from the tree to be harvested from a land vehicle. The tree harvesting tool 117 may of its own motion move from the position on ground to the desired tree to be harvested. Communication between the UAV 100 and the tree harvesting tool 117 may at any desired time result in a pick-up of the tree harvesting tool 117 by the UAV 100. The pickup of the tree harvesting tool 117 by the UAV 100 may be made on ground if there is enough space or on a trunk of a tree.

In various example embodiments, the UAV 100 may comprise a power unit for powering the UAV 100 and the tree harvesting tool 117. The power from the power unit in the UAV 100 may be delivered to the tree harvesting tool 117 via at least one power cable. The power unit may be an electric motor, such as a battery driven electric motor, and/or an internal combustion engine.

In various example embodiments, the UAV 100 may comprise at least a first power unit for powering the UAV 100 and the tree harvesting tool 117 may comprise at least a second power unit for powering the tree harvesting tool 117. The power unit in the UAV 100 may be electrical and/or an internal combustion engine. The power unit in the tree harvesting tool 117 may be electrical and/or an internal combustion engine.

In various example embodiments, the tree harvesting tool 117 is also configured for delimbing a tree. The delimbing may be performed from top to bottom if the tree harvesting tool 117 is initially arranged on the tree to be harvested from above. In various example embodiments, the delimbing may be performed from bottom to the top if the tree harvesting tool 117 is moved by its own motion from ground to the tree to be harvested or attached to a lower section of the tree to be harvested from the UAV 100. The delimbing may be performed by one or a plurality of cutting means 116, snapping means, and/or shearing means 114a, 114b, see FIG. 5. The cutting means 116 may be by cutting chains and/or by rotary cutting disks. The cutting may be performed by a straight movement along the trunk by the tree harvesting tool 117 or a part of the tree harvesting tool 117, i.e., means 110 configured for harvesting at least a portion of a tree, and/or by a serpentine movement along the trunk by the tree harvesting tool 117 or the means 110 configured for harvesting at least a portion of a tree.

In various example embodiments, the tree harvesting tool 117 is configured to be in direct communication with a remote operator and/or a remote base station 120 or indirect communication via the UAV 100 with a remote operator and/or a base station 120. The indirect communication, i.e., the UAV 100 as access point, with the tree harvesting tool 117 may be used if the same information is to be sent to both UAV 100 and the tree harvesting tool 117. The UAV 100 may in various example embodiments work independently from a remote base station 120. The indirect communication may also be used if the UAV 100 is arranged in between the base station 120 and the tree harvesting tool 117.

In various example embodiments, the UAV and/or the tree harvesting tool 117 may comprise means configured for automatically locating a tree and/or a predetermined area to be harvested. The means configured for automatically locating a tree and/or the predetermined area to be harvested may comprise at least a Global Navigation Satellite System, GNSS. The means configured for automatically locating a tree and/or a predetermined area to be harvested may comprise at least one camera or optical sensor. The means configured for automatically locating a tree and/or a predetermined area to be harvested may comprise at least a camera in combination with AI or machine learning algorithms for speeding up the detection of a suitable area to arrange the tree harvesting tool 117 or the means 110 configured for harvesting at least a portion of a tree.

Now returning to FIG. 1 where the UAV 100 is on its way to a tree 135a-135d in forest 130 to be harvested. The tree 135a-135d may be preselected, i.e., selected prior to arrival to the tree 135a-135d. Alternatively the tree 135a-135d may be selected by the UAV 100 in combination with the base station 120 once the UAV 100 is at or near a position above the tree 135a-135d. The selection may be performed by identifying a picture of the tree 135a-135d from above with stored pictures in the control station 120 and by means of a selection algorithm select a tree 135a-135d for tree thinning purpose or other selection criteria.

In FIG. 1, the forest 130 comprises four trees 135a-135d, all of which may have equal or different tree parameters and/or growing conditions. The forest may of course have a larger or smaller amount of trees than the depicted four as shown in FIGS. 1-2. A tree 135a-135d to be harvested may be determined by at least one of the detected tree parameters and/or growing conditions. In various example embodiments, the order of harvesting tree 135a-135d may be selected for minimizing a total harvesting time. In various example embodiments, a particular tree may be selected because there is a demand for such tree parameters from a particular customer. In various example embodiments, a particular tree may be selected to be harvested due to a particular tree thinning strategy, e.g., smallest or largest tree in a group of tree, diameter of the at least a portion of a tree, length of the at least a portion of a tree, tree species of the at least a portion of a tree and/or the weight of the at least a portion of a tree, dry content, twig-free, rootstock, density, rot, discoloured, dead tree and/or insect infested. Tree parameters may be detected prior to arriving with the UAV 100 to the forest 130. This may be made manually and/or automatically. Manual detection may be made by a human being registering at least one tree parameter in a digital database. Automatic tree parameter detection may be made by a separate UAV and/or a land-based vehicle. Detection may be non-destructive and/or destructive.

The tree harvesting tool 117 comprises one or a plurality of forcing means, here illustrated as a single propeller 175. The propeller 175 may be removably attached to the tree harvesting tool 117. The propeller 175 is in FIG. 1 illustrated to be attached to a back side of the tree harvesting tool 117, whereas the holding means 105 and delimbing means 114a, 114b (see FIG. 5) are provided on a front side of the tree harvesting tool 117. The propeller 175 may be configured to force the tree harvesting tool 117 in a predetermined direction. The propeller 175 may also be configured for damping pendulum motion of the tree harvesting tool 117 hanging beneath the UAV 100. The propeller 175 may be remotely and/or autonomously controlled. A single propeller 175 may be tilted in various directions in order to vary its direction of thrust. In various example embodiments, a plurality of propellers 175 may be attached to the tree harvesting tool 117, each of which propellers 175 having different directions of thrust in order to have full controllability of the tree harvesting tool 117, i.e., control of moving the tree harvesting tool in any horizontal direction and/or rotating the tree harvesting tool 117 around its own vertical axis.

The tree harvesting tool 117 may be attached to the UAV 100 via one or multiple, i.e., at least two, cords 122, 124.

FIG. 2 illustrates another example embodiment of a tree harvesting tool 117, in which the propeller in FIG. 1 has been exchanged with a gas ejector 177. The gas ejector 177 is configured to move the tree harvesting tool 117 in a predetermined direction, rotate the tree harvesting tool 117 around its own vertical axis and/or damping pendulum motion and/or rotational motion of the tree harvesting tool 117. In FIG. 2 only one gas ejector 177 is illustrated, however one or a plurality of gas ejectors 177 may be used for controlling movement, rotation and/or damping rotational and/or pendulum motion. A single gas ejector 177 may be tilted in order to vary its direction of thrust. A plurality of gas ejectors 177 may be arranged so as to fully control the directional movement, rotational movement and/or damping pendulum motions or rotational motion. In various example embodiments, one or a plurality of propellers 175 may be combined with one or a plurality of gas ejectors 177. A first propeller 175 may have a first direction of thrust and a first gas ejector 177 may have a second direction of thrust, where the first and second directions are different to each other. The gas ejector 177 may be provided with gas from a container with pressurised gas.

Figure 3A:
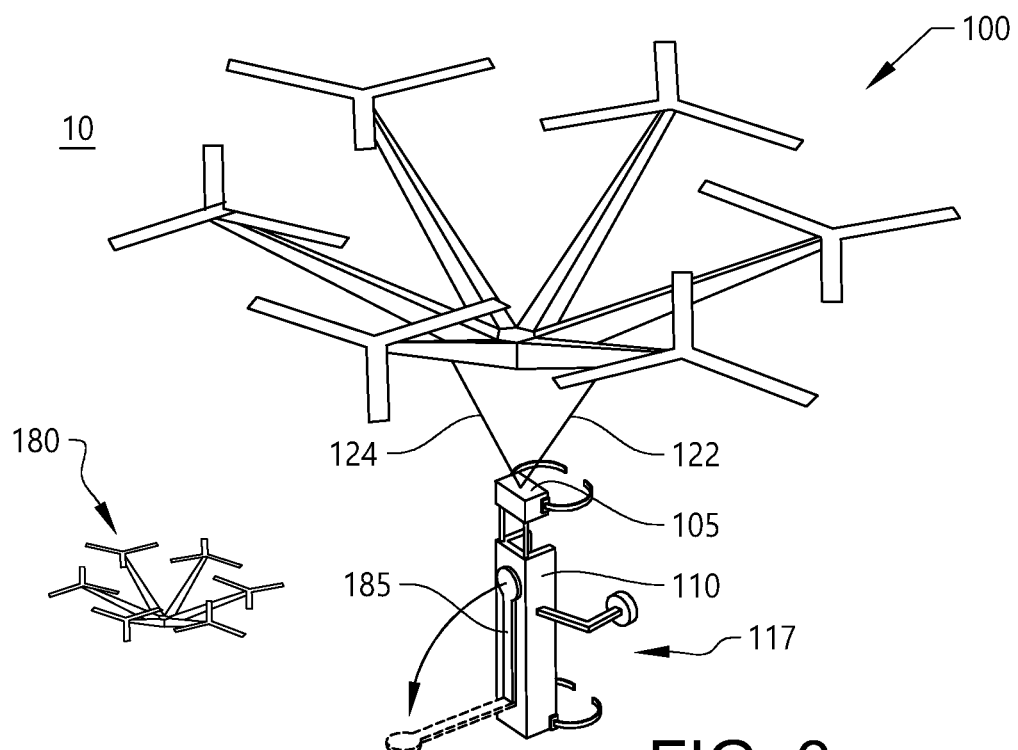
FIGS. 3a-b depict an example embodiment of an aerial tree harvesting tool attached beneath a UAV according to the present invention.
Figure 3B:
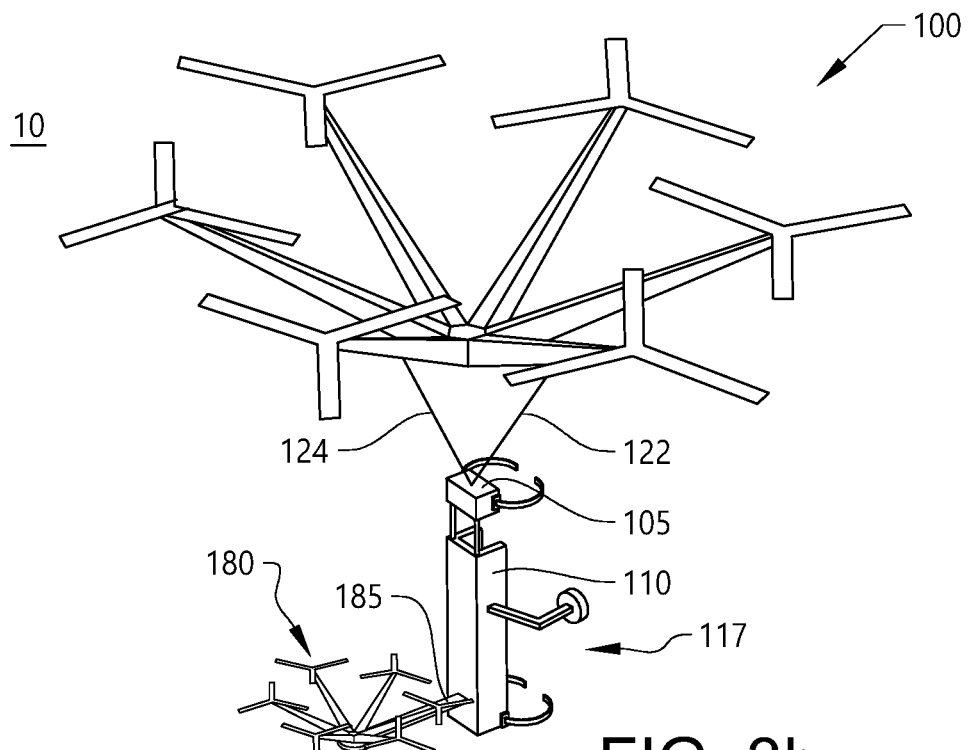

FIGS. 3a and 3b illustrate an example embodiment of an aerial tree harvester 10 comprising a UAV 100 and a tree harvesting tool 117 attached via at least one cord 122, 124 beneath the UAV 100. The tree harvesting tool 117 may be provided with a platform 185 for a minidrone 180. The platform 185 may as illustrated in FIGS. 3a and 3b be in a folded rest position as illustrated in FIG. 3a or in a folded out position as illustrated in FIG. 3b ready for receiving a minidrone 180. A minidrone 180 is configured to be used as a control tool for moving the tree harvesting tool 117 in a predetermined direction or damping pendulum motion or rotational motion of the tree harvesting tool 117 when being attached to the tree harvesting tool 117. The minidrone 180 may as in FIG. 3a be removably attached to the tree harvesting tool 117. The minidrone 180 and the UAV 100 may be controlled separately from each other. The UAV 100 may be considered as the primary UAV for moving the tree harvesting tool 117 to a desired location and the minidrone 180 can be considered to be a secondary UAV, which is used for fine adjustments of the position of the tree harvesting tool 117 if necessary and/or damping any undesired oscillating motions of the tree harvesting tool 117 prior to releasing the tree harvesting tool 117 above a tree to be delimbed. The minidrone 180 may be used in a short moment, i.e., for controlling and/or stabilising the tree harvesting tool 117 to a predetermined position above a top of a tree to be delimbed. As soon as the tree harvesting tool 117 has achieved an acceptable position and/or with acceptable disturbing oscillating movement, the minidrone 180 may be detached from the tree harvesting tool 117. The tree harvesting tool 117 may be released from the UAV 100 in order to delimb the tree to be harvested when the acceptable position and/or acceptable oscillating movement has been achieved. The platform 185 may be folded and folded out autonomously and/or remotely controlled. The minidrone 180 may comprise means for detecting the platform 185, such as a camera or similar means. The minidrone 180 and/or the platform 185 may comprise docking means for securing the minidrone 180 to the platform 185. The docking means may be electromagnetic coupling means, mechanical coupling means, electromechanical coupling means or similar. The coupling means for securing the minidrone 180 to the platform may be remotely and/or autonomously controlled. When the minidrone 180 is docked to the platform 185, the minidrone 180 may perform any moving action as a free minidrone 180 except for the posed restrictions of the cords 122, 124 between the UAV 100 and the tree harvesting tool 117.

The minidrone 180 may, when docked at the platform 185, be charged from the tree harvesting tool 117 and/or the UAV 100. The platform 185 may be in the folded rest position when the harvesting tool is delimbing a tree, cutting a tree and/or transporting a harvested tree.

In an alternative example embodiment, the platform 185 may always be in a folded out position as in FIG. 3b, with or without the minidrone 180. The platform 185 may be resiliently attached to the aerial tree harvesting tool 117 meaning that it may be forced into a folded position if an external force is acting on it.

Figure 4A:
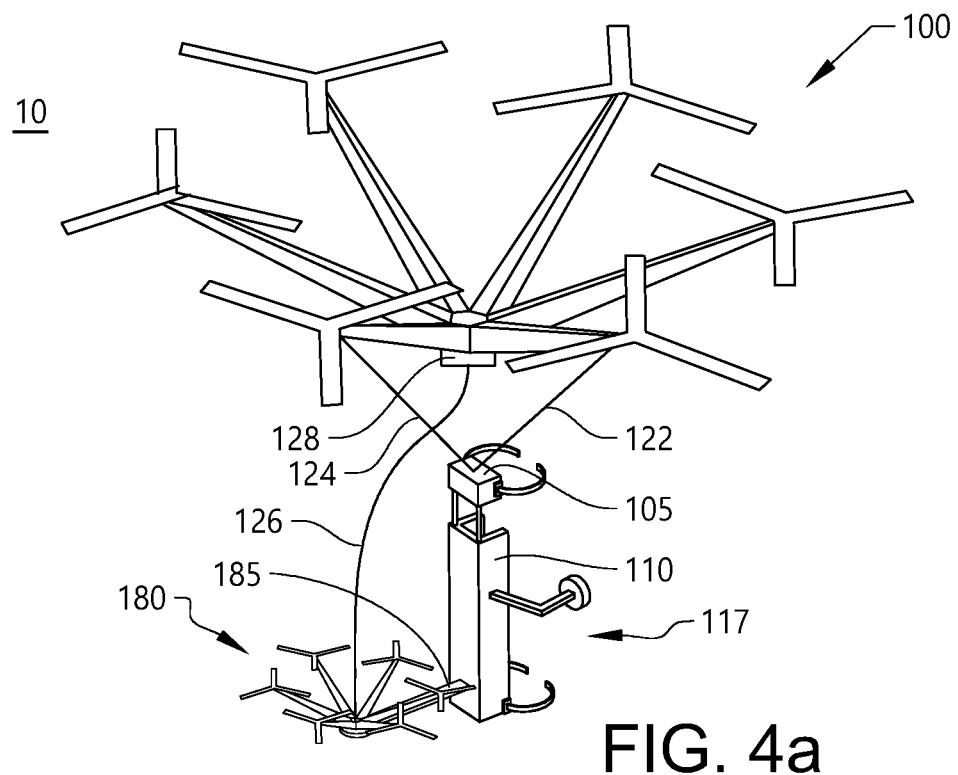
FIGS. 4a-b depict another example embodiment of an aerial tree harvesting tool attached beneath a UAV according to the present invention.
Figure 4B:
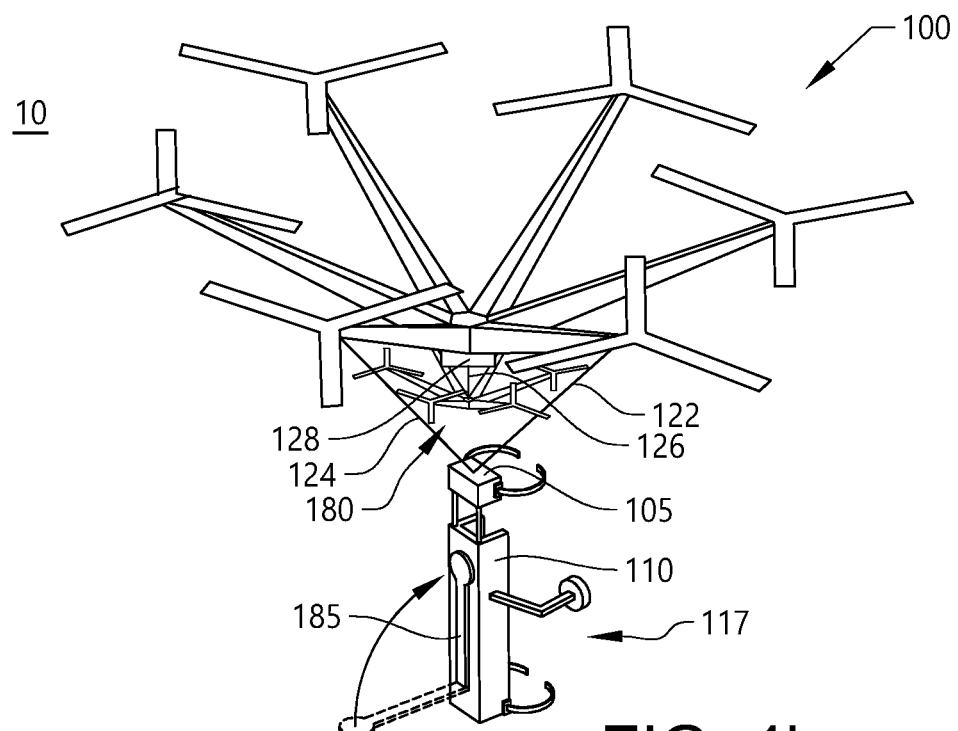

FIGS. 4a and 4b depict another example embodiment of an aerial tree harvester 10. Here the minidrone 180 is attached to the UAV 100 via at least one cord 126. In FIG. 4a the minidrone 180 is docked at the platform 185 and the cord 126 is in a rolled out position by a winch 128.

In FIG. 4b the minidrone 180 is detached from the platform 185 and the platform 185 is in a folded rest position. The winch 128 has rolled in the cord 126 in order to provide the minidrone 180 close to an underside of the UAV 100. The minidrone 180 may be attached to the UAV 100 when it is not docked at the platform 185 on the tree harvesting tool 117.

Power to the tree harvesting tool 117 may be delivered via one or a plurality of power cables arranged between the UAV 100 and the tree harvesting tool 117. Alternatively, a power unit may be provided in the tree harvesting tool 117 in the form of one or a plurality of battery packs. In various example embodiments a first battery pack may be used for communication with the UAV 100 and/or a base station 120. A second battery pack may be used for moving the tree harvesting tool 117 up/down on a tree trunk and/or for moving the tree harvesting tool 117 on ground.

FIG. 5 depicts a schematic picture of an example embodiment of the tree harvesting tool 117 comprising means 110 configured for cutting and/or delimbing at least a portion of a tree and the holding means 105 configured for holding the tree. The holding means 105 configured for holding a tree may be provided at a distance from the UAV 100, for instance via one or a plurality of wires/cords 122, 124. The holding means 105 configured for holding a tree is, in this example embodiment, in the form of a first movable curved arm 107*a* and a second movable curved arm 107*b*. The arms 107*a*, 107*b* can be set to any position between a fully open position and fully closed position in order to allow to embrace a tree trunk and also to grip and release the same. The arms 107*a*, 107*b* may be configured to be disposed around the tree trunk and locked around the tree trunk. The arms 107*a*, 107*b* are configured to be fixed onto the tree trunk at a predetermined position. The means 110 configured for cutting and/or delimbing at least a portion of a tree comprises in FIG. 5 a first movable curved fixing/delimbing arm 114*a* and a second movable curved fixing/delimbing arm 114*b*. The first and second movable curved fixing/delimbing arms 114*a*, 114*b* may be set to any position between a fully open position and fully closed position on order to allow to embrace a tree trunk and also to fixing the same. The fixing/delimbing arms 114*a*, 114*b* may have a sharp edge on its top portion and/or its bottom portion for delimbing the tree as the means 110 configured for cutting and/or delimbing at least a portion of a tree moves along the trunk of the tree. The means 110 configured for cutting and/or delimbing at least a portion of a tree may also comprise at least one cutter 116. The at least one cutter 116 may be in the form of an electrically driven or internal combustion engine driven chain saw. The chain saw may be arranged movable in the means 110 configured for cutting and/or delimbing at least a portion of a tree in order to cut a tree while the means 110 configured for cutting and/or delimbing at least a portion of a tree is in a fixed position on a tree trunk.

The tree harvesting tool 117 may comprise the hereinabove mentioned platform 185 configured for docking a minidrone 180. In various example embodiments the tree harvesting tool 117 may comprise removable attached propeller(s) 175 and/or gas ejector(s) 177.

The delimbing means 114*a*, 114*b* may be optional. The holding means 105 may be provided at a distance from the means 110 configured for cutting and/or delimbing at least a portion of a tree. The holding means 105 may be attached at the means 110 configured for cutting and/or delimbing at least a portion of a tree with at least one wire 111*b* or at least one metal bar or other suitable attaching means.

In various example embodiments, the holding means 105 may be mechanically separable from the means 110 configured for cutting and/or delimbing at least a portion of a tree, meaning that the holding means 105 may attached at a fixed position at the tree while the means 110 configured for cutting and/or delimbing at least a portion of the tree may of its own motion move along the trunk of the tree with no mechanical attachment to the holding means 105. The means 110 configured for cutting and/or delimbing at least a portion of a tree may cut a portion of a tree and stay on the still not harvested portion of the tree while the UAV 100 is moving away with the harvested portion to another location. Delimbing may take place by the means 110 configured for cutting and/or delimbing at least a portion of a tree while the UAV 100 is moving away the harvested portion of the tree. The UAV 100 may return to the same tree and remove yet another portion of it and the means 110 configured for cutting and/or delimbing at least a portion of a tree may stay on the not yet harvested portion or be attached to the harvested portion or the UAV 100 and move together with the UAV 100 to another location. The holding means 105 and the means 110 configured for cutting and/or delimbing at least a portion of a tree may communicate with each other and/or independently of each other communicate with the UAV 100 and/or the base station 120. A camera may be used, attached either on the UAV 100, the holding means 105 and/or the means 110 configured for cutting and/or delimbing at least a portion of a tree, in order to simplify attachment of the UAV 100 with the means 110 configured for cutting and/or delimbing at least a portion of a tree. The attachment of the UAV 100 and the means 110 configured for cutting and/or delimbing at least a portion of a tree and/or the holding means 105 may be a fully automatic process. The means 110 configured for cutting and/or delimbing at least a portion of a tree may have at least one electrically driven wheel 190, a traction wheel, for allowing movement of the means 110 configured for cutting and/or delimbing at least a portion of a tree along a trunk of a tree. One or a plurality of supporting wheels 112 may be used for securing the means 110 configured for cutting and/or delimbing at least a portion of a tree onto the trunk of the tree and for reducing friction while moving along the trunk of the tree. The supporting wheel(s) 112 may be arranged on arms 188 which may be movable in order to secure the means 110 configured for cutting and/or delimbing at least a portion of a tree on the trunk of the tree.

In various example embodiments, the means 110 configured for cutting and/or delimbing at least a portion of a tree and the holding means 105 may be a single unit or two separable units. The means 110 configured for cutting and/or delimbing at least a portion of a tree may be capable of its own motion to move up and down along the trunk of the tree, which can delimb and/or cut the tree. The movement may be made by at least one wheel 190 arranged on a base structure 650.

The UAV 100 may comprise means configured for detecting rotational motion and/or pendulum motion of the tree harvesting tool 117, which may be in the form of at least one camera. At least one camera may be provided on the UAV 100 for detecting a tree to be harvested. The camera for detecting the tree to be harvested may be the same camera as the camera for detecting rotational motion and/or pendulum motion of the tree harvesting tool 117. Another example of means configured for detecting rotational motion and/or pendulum motion of the tree harvesting tool 117 is at least one gyrometer or gyroscope.

The holding means 105 may change its position onto the tree trunk during cutting, delimbing, harvesting, transporting and/or debarking the tree trunk. The holding means 105 may be a ring structure having a larger diameter than the diameter of the tree in order to secure the tree from falling.

Delimbing may be performed by so-called gravity delimbing. The means 110 configured for cutting and/or delimbing at least a portion of a tree attached underneath of the UAV 100 is provided at a predetermined distance above a tree to be delimbed. When the means 110 configured for cutting and/or delimbing at least a portion of a tree has been provided above a tree to harvest, the means 110 configured for cutting and/or delimbing at least a portion of a tree may be dropped/released from the UAV 100 towards ground. The at least one cutting means 114a, 114b for delimbing a tree in the form of a knife will due to the weight and speed of the means 110 configured for cutting and/delimbing at least a portion of a tree start to delimb the tree. If not all limbs are cut in a single delimbing action, the process may start all over, i.e., the means 110 configured for cutting and/or delimbing at least a portion of a tree may be picked up by the UAV 100 and once again be dropped to perform another gravity delimbing of the remaining limbs. This may continue until all or a predetermined amount of limbs are removed from the tree trunk. Additional weight may greatly assist in this delimbing process. The base structure 650 may comprise one or a plurality of batteries for powering the movable holding means 105, the traction wheel 190, the movable arms 188 with rollers 112, the movable cutting means 114a, 114b for delimbing a tree and/or an electrified cutting means 116. The movable holding means 105, the traction wheel 190, the movable arms 188 with rollers 112, the movable cutting means 114a, 114b for delimbing a tree and/or the electrified cutting means 116 may be autonomously controlled via the UAV 100 or directly from a remote location. The base structure 650 may be an elongated structure onto which the movable holding means 105, the traction wheel 190, the movable arms 188 with rollers 112, the movable cutting means 114a, 114b for delimbing a tree and/or the electrified cutting means 116 may be attached. In an example embodiment, the movable holding means 105, movable arms 188 with rollers 112, the movable cutting the means 114a, 114b for delimbing a tree and/or the electrified cutting means 116 are all extending from the base structure 650 in essentially the same general direction in order to embrace, cut or to delimb a tree trunk. The movable holding means 105, the traction wheel 190, the movable arms 188 with rollers 112, the movable cutting means 114a, 114b for delimbing a tree and/or the electrified cutting means 116 together with motorized units for them, battery pack and means for communication with UAV 100 and/or a remote base station 120 may be grouped in one single unit. The movable holding means 105, the traction wheel 190, the movable arms 188 with rollers 112, the movable cutting means 114a, 114b for delimbing a tree and/or the electrified cutting means 116 may be operated autonomously independent from each other.

The holding means 105 and the means 110 configured for harvesting at least a portion of a tree may communicate with each other and/or independently of each other communicate with the UAV 100 and/or the base station 120. A camera may be used, attached either on the UAV 100 or the means 110 configured for harvesting at least a portion of a tree, in order to simplify attachment of the UAV 100 with the means 110 configured for harvesting at least a portion of a tree.

In various example embodiments, the tree harvesting tool 117 be made of two separable parts, a first part 105 that is mainly configured for holding the tree and a second part 110, capable of moving up and down along the trunk of the tree, which can delimb and/or cut the tree.

In various example embodiments, a primary UAV 100, and a secondary UAV, minidrone 180, may be used together.

The primary UAV 100 may be used as disclosed hereinabove, namely to transport the tree harvesting tool 117 from one position to another, hovering above a tree while harvesting and transporting the harvested tree away from its original location. The secondary UAV 180 may be used for stabilizing and/or collecting info about tree to be harvested. The secondary UAV 180 may force the tree harvesting tool 117 out of its equilibrium position. The equilibrium position of the tree harvesting tool 117 hanging straight beneath a hoovering primary UAV 100 in case of no wind. In windy condition the equilibrium position may be at an angle with respect to straight beneath the primary UAV 100. Windy conditions and/or movement of the primary UAV 100 with the hanging tree harvesting tool 117 beneath may also induce pendulum and/or rotational motion of the tree harvesting tool 117. The secondary UAV 180 may reduce or eliminate any rotational motion and/or pendulum motion. The secondary UAV 180 may also rotate the tree harvesting tool 117 to a desired rotational position. The secondary UAV 180 may also force the tree harvesting tool 117 in a predetermined direction, for instance towards at the tree to be harvested.

A tree to be harvested may be determined by using old information such as old photos from above a particular area of a forest. The tree selection may be changed when the secondary UAV 180 examines the tree from above and/or from a side or from below. Any wildlife such as bird nest or similar may qualify as rejecting harvesting of a particular tree. The information at hand may also be incomplete. Incomplete info may for instance be picture from above with low resolution, incomplete info from below and/or incomplete info about tree top position.

New information from secondary UAV 180 about tree parameters and/or growing condition before delimbing may change the initial harvesting decision of a particular tree. New information may be from above tree canopy and/or below tree canopy. One and the same minidrone may be used for stabilizing as for collecting info.

A first minidrone 180 may be used for collecting info whereas a second minidrone 180 may be used for stabilizing and/or movement action of the tree harvesting tool 117. Minidrones 180 may be carried by the primary UAV 100 or the tree harvesting tool 117 to a harvesting destination. Harvesting destinations may be km away from a departure point. Minidrones 180 do not discharge its batteries while being carried by the primary UAV 100 during transport from one position to another. The minidrone 180 may be disconnected from the tree harvesting tool 117 or said the primary UAV 100 for investigation prior to delimbing a particular tree.

The minidrone 180 may be attached to the tree harvesting tool 117 for stabilizing and/or moving the tree harvesting tool 117 to a desired position before delimbing a tree from above by gravity delimbing, The minidrone 180 may be disconnected from the tree harvesting tool 117 when delimbing occurs for avoiding damage to the minidrone 180. The minidrone 180 may be connected after delimbing when the tree harvesting tool 117 is close to ground level. Any camera on the minidrone 117 may be prohibited to be dirty, i.e., may be protected from being dirty, since it is not close to, not attached to the tree harvesting tool 117, when delimbing and/or cutting the tree. A camera on the minidrone 180 may assist in determining the movement of the tree harvesting tool 117 in combination with a camera provided on the primary UAV 100.

The minidrone 180 may be several times smaller than the primary UAV 100. The minidrone 180 may be less than 25 cm in diameter.

The above-described embodiments of for controlling positioning of a tree harvesting tool 117, such as by for damping detected pendulum motion of the tree harvesting tool 117 and/or configured for moving the tree harvesting tool 117 in a predetermined horizontal direction and/or configured for rotating the tree harvesting tool 117 around a vertical direction and/or configured for damping detected rotational movement of the tree harvesting tool 117 around a vertical direction, is beneficial not only for tree harvesting tools 117 attached underneath an UAV 100 via at least one cord 122, 124. In clear contrast, the present invention and the various embodiments thereof can be applied generally to any holding tool 117 attached underneath an UAV 100 via at least one cord 122, 124 and configured for holding and transporting payload.

Hence, the invention also relates to an unmanned aerial system 1 comprising a remotely and/or autonomously controlled UAV 100. The system 1 also comprises an autonomously and/or remotely controlled holding tool 117 configured for holding a payload. The holding tool 117 is attached underneath the UAV 100 via at least one cord 122, 124. The system 1 further comprises a means configured for detecting rotational motion and/or pendulum motion of the holding tool 117. The system 1 additionally comprises a base station 120 configured for communication with the UAV 100 and means attached to the UAV 100 configured for detecting payload from above. The system 1 also comprises at least one remotely and/or autonomously controlled forcing means 175, 177, 180, attached to the holding tool 117, configured for damping detected pendulum motion of the holding tool 117 and/or configured for moving the holding tool 117 in a predetermined horizontal direction and/or configured for rotating the holding tool 117 around a vertical direction and/or configured for damping detected rotational movement of the holding tool 117 around a vertical direction.

The holding tool 117 could be any tool, equipment or device attached underneath the UAV via at least one cord 122, 124 and configured for releasably holding a payload, i.e., attach to the payload at the pick-up location, hold the payload will transported by the UAV 100 and then release the payload at a selected destination. The particular design of the holding tool 117 is at least partly dependent on the particular payload to be transported by the UAV 100. Illustrative, but non-limiting, examples of such holding tools 117 include gripping arm 107a, 107b, at least one, preferably lockable, hook, etc.

The embodiments described in the foregoing in connection with FIGS. 1 to 5 for the at least one remotely and/or autonomously controlled forcing means 175, 177, 180 also applied to the unmanned aerial system 1.

In an embodiment, the at least one cord 122, 124 is attached to an autonomously and/or remotely controlled winch 128 configured for rolling in or rolling out the at least one cord 122, 124. The winch 128 is attached to the UAV 100 and/or the holding tool 117.

In an embodiment, the forcing means 175, 177, 180 is at least one propeller motor 175 and/or at least one gas ejecting means 177.

In an embodiment, forcing means 175, 177, 180 is removably attached to the holding tool 117.

In an embodiment, the removably attached forcing means 175, 177, 180 is at least one autonomously and/or remotely controlled minidrone 180.

In an embodiment, the system further comprises a remotely and/or autonomously controlled docking means for engaging or disengaging the holding tool 117 with the minidrone 180.

In an embodiment, the minidrone 180 is attached to the UAV 100 via at least one cord 126. The at least one cord 126 is attached to an autonomously and/or remotely controlled winch 128 configured for rolling in or rolling out said at least one cord 126. The winch 128 is attached to the UAV 100 and/or the minidrone 180.

In an embodiment, the holding tool 117 further comprising a platform 185 configured for attaching said minidrone 180.

In an embodiment, the platform 185 is configured to be set in a folded rest position where the platform 185 is essentially parallel to a base structure 650 of the holding tool 117 or a folded out minidrone attachment position where the platform 185 is essentially perpendicular to the base structure 650 of the holding tool 117.

In an embodiment, the platform 185 is autonomously and/or remotely controlled to be set in a folded rest position or a folded out minidrone attachment position.

In an embodiment, the system 1 further comprises a camera provided on the UAV 100 with a field of view in a direction towards ground and means configured for sending out wireless video data from the camera.

In an embodiment, the UAV 100, the camera and the forcing means 175, 177, 180 are configured to provide the holding tool 117 at a predetermined position above a payload and with a predetermined rotational position with respect to a longitudinal axis of the holding tool 117.

The payload to be captured and held by the holding tool 117 could be any payload or cargo to be transported by the UAV 100. Illustrative, but non-limiting examples of such payload include bags, totes, boxes, packaging, containers, tools for cleaning wings of wind mills, and the like.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

The invention claimed is:

1. An unmanned aerial tree harvesting system comprising:
 a remotely or autonomously controlled Unmanned Aerial Vehicle (UAV);
 an autonomously or remotely controlled tree harvesting tool configured for at least one of holding, delimbing or cutting at least a portion of a tree trunk, wherein said tree harvesting tool is attached underneath the UAV via at least one cord;
 a means configured for detecting at least one of rotational motion or pendulum motion of said tree harvesting tool;
 a base station configured for communication with said UAV;

means attached to said UAV configured for detecting trees from above; and at least one remotely or autonomously controlled forcing means, attached to said tree harvesting tool, configured for at least one of damping detected pendulum motion of said tree harvesting tool, moving said tree harvesting tool in a predetermined horizontal direction, rotating said tree harvesting tool around a vertical direction, or damping detected rotational movement of said tree harvesting tool around a vertical direction, wherein:
said forcing means is removably attached to said tree harvesting tool,
said removably attached forcing means is at least one autonomously or remotely controlled minidrone, and
said unmanned aerial system further comprises a remotely or autonomously controlled docking means for engaging or disengaging said tree harvesting tool with said minidrone.

2. The unmanned aerial system according to claim 1, wherein said at least one cord is attached to an autonomously or remotely controlled winch configured for rolling in or rolling out said at least one cord, where said winch is attached to said UAV or said tree harvesting tool.

3. The unmanned aerial system according to claim 1, wherein said minidrone is attached to said UAV via at least one cord, said at least one cord is attached to an autonomously or remotely controlled winch configured for rolling in or rolling out said at least one cord, where said winch is attached to said UAV or said minidrone.

4. The unmanned aerial system according to claim 1, wherein said tree harvesting tool further comprising a platform configured for attaching said minidrone.

5. The unmanned aerial system according to claim 4, wherein said platform is configured to be set in a folded rest position where said platform is essentially parallel to a base structure of said tree harvesting tool or a folded out minidrone attachment position where said platform is essentially perpendicular to said base structure of said tree harvesting tool.

6. The unmanned aerial system according to claim 5, wherein said platform is autonomously or remotely controlled to be set in said folded rest position or a folded out minidrone attachment position.

7. The unmanned aerial system according to claim 1, further comprising a camera provided on said UAV with a field of view in a direction towards ground and means configured for sending out wireless video data from said camera.

8. The unmanned aerial system according to claim 7, wherein said UAV, said camera and said forcing means are configured to provide said tree harvesting tool at a predetermined position above a predetermined tree and with a predetermined rotational position with respect to a longitudinal axis of said tree harvesting tool.

9. A method for controlling a tree harvesting tool attached via at least one cord beneath a remotely or autonomously controlled Unmanned Aerial Vehicle (UAV) said method comprising the step of:
damping at least one of pendulum motion or rotational movement of a tree harvesting tool or fine adjusting a position of said tree harvesting tool relative to a predetermined position by means of at least one remotely or autonomously controlled forcing means attached to said tree harvesting tool, wherein:
said forcing means is removably attached to said tree harvesting tool,
said removably attached forcing means is at least one autonomously or remotely controlled minidrone, and
said tree harvesting tool is engaged or disengaged with said minidrone via a remotely or autonomously controlled docking means.

10. The method according to claim 9, further comprising the step of controlling autonomously or remotely a winch, where said winch is attached to said UAV or said tree harvesting tool for at least one of reducing or increasing the distance between said UAV and said tree harvesting tool by rolling in or rolling out said at least one cord by said winch.

11. An aerial tree harvesting method comprising the steps of:
providing a tree harvesting tool having delimbing means, attached beneath a primary Unmanned Aerial Vehicle (UAV) via at least one cord, at a predetermined distance above a tree to be harvested;
at least one of adjusting a position of said tree harvesting tool or damping a pendulum or a rotational motion of said tree harvesting tool by a secondary UAV removably attached to said tree harvesting tool;
releasing said tree harvesting tool from said UAV; and
detaching said secondary UAV from said tree harvesting tool at a predetermined time period before or after said tree harvesting tool is released from said primary UAV for delimbing said tree to be harvested.

12. The method according to claim 11, wherein said detaching of said secondary UAV from said tree harvesting tool is made before said delimbing process is started.

13. The method according to claim 11, wherein said movement of said secondary UAV is independent of the position or movement of said primary UAV.

14. The method according to claim 11, wherein said primary UAV is configured to fly above the canopy of said tree to be harvested while said secondary UAV is configured to fly above or below said canopy of said tree to be harvested.

15. An unmanned aerial system comprising:
a remotely or autonomously controlled Unmanned Aerial Vehicle (UAV);
an autonomously or remotely controlled holding tool configured for holding a payload, wherein said holding tool is attached underneath said UAV via at least one cord;
a means configured for detecting at least one of rotational motion or pendulum motion of said holding tool;
a base station configured for communication with said UAV;
means attached to said UAV configured for detecting payload from above; and
at least one remotely or autonomously controlled forcing means, attached to said holding tool, configured for at least one of damping detected pendulum motion of said holding tool, moving said holding tool in a predetermined horizontal direction, rotating said holding tool around a vertical direction, or damping detected rotational movement of said holding tool around a vertical direction, wherein:
said forcing means is removably attached to said tree harvesting tool,
said removably attached forcing means is at least one autonomously or remotely controlled minidrone, and said unmanned aerial system further comprises a remotely or autonomously controlled docking means for engaging or disengaging said tree harvesting tool with said minidrone.

16. An unmanned aerial tree harvesting system comprising:
a remotely or autonomously controlled Unmanned Aerial Vehicle (UAV);
an autonomously or remotely controlled tree harvesting tool configured for at least one of holding, delimbing, or cutting at least a portion of a tree trunk, wherein said tree harvesting tool is attached underneath the UAV via at least one cord;
a means configured for detecting at least one of rotational motion or pendulum motion of said tree harvesting tool;
a base station configured for communication with said UAV;
means attached to said UAV configured for detecting trees from above; and
at least one remotely or autonomously controlled forcing means, attached to said tree harvesting tool, configured for at least one of damping detected pendulum motion of said tree harvesting tool, moving said tree harvesting tool in a predetermined horizontal direction, rotating said tree harvesting tool around a vertical direction, or damping detected rotational movement of said tree harvesting tool around a vertical direction,
wherein:
said forcing means is removably attached to said tree harvesting tool,
said removably attached forcing means is at least one autonomously or remotely controlled minidrone, and
said tree harvesting tool further comprises a platform configured for attaching said minidrone.

17. The unmanned aerial system according to claim 16, wherein said platform is configured to be set in a folded rest position where said platform is essentially parallel to a base structure of said tree harvesting tool or a folded out minidrone attachment position where said platform is essentially perpendicular to said base structure of said tree harvesting tool.

18. The unmanned aerial system according to claim 17, wherein said platform is autonomously or remotely controlled to be set in said folded rest position or a folded out minidrone attachment position.

19. The unmanned aerial system according to claim 16, wherein said at least one cord is attached to an autonomously or remotely controlled winch configured for rolling in or rolling out said at least one cord, where said winch is attached to said UAV or said tree harvesting tool.

20. The unmanned aerial system according to claim 16, wherein said minidrone is attached to said UAV via at least one cord, said at least one cord is attached to an autonomously or remotely controlled winch configured for rolling in or rolling out said at least one cord, where said winch is attached to said UAV or said minidrone.

21. The unmanned aerial system according to claim 16, further comprising a camera provided on said UAV with a field of view in a direction towards ground and means configured for sending out wireless video data from said camera.

22. The unmanned aerial system according to claim 21, wherein said UAV, said camera and said forcing means are configured to provide said tree harvesting tool at a predetermined position above a predetermined tree and with a predetermined rotational position with respect to a longitudinal axis of said tree harvesting tool.

* * * * *